(12) United States Patent
Thornton et al.

(10) Patent No.: US 10,844,730 B2
(45) Date of Patent: Nov. 24, 2020

(54) CENTRIFUGAL AIRFOIL COOLING MODULATION

(71) Applicant: United Technologies Corporation, Farmington, CT (US)

(72) Inventors: Lane Thornton, Tolland, CT (US); Thomas N. Slavens, Norman, OK (US)

(73) Assignee: United Technologies Corporation, Farmington, CT (US)

(*) Notice: Subject to any disclaimer, the term of this patent is extended or adjusted under 35 U.S.C. 154(b) by 29 days.

(21) Appl. No.: 16/353,563

(22) Filed: Mar. 14, 2019

(65) Prior Publication Data

US 2019/0211691 A1 Jul. 11, 2019

Related U.S. Application Data

(63) Continuation of application No. 15/100,925, filed as application No. PCT/US2014/069128 on Dec. 8, 2014, now Pat. No. 10,273,809.

(Continued)

(51) Int. Cl.
*F01D 5/18* (2006.01)
*F01D 5/28* (2006.01)
(Continued)

(52) U.S. Cl.
CPC .............. *F01D 5/186* (2013.01); *F01D 5/187* (2013.01); *F01D 5/28* (2013.01); *F02C 3/04* (2013.01);
(Continued)

(58) Field of Classification Search
CPC . F01D 5/186; F01D 5/187; F01D 5/28; F02C 3/04; F02C 7/12; F05D 2220/32;
(Continued)

(56) References Cited

U.S. PATENT DOCUMENTS 3,972,181 A 8/1976 Swayne
4,043,841 A 8/1977 Bibring
(Continued)

FOREIGN PATENT DOCUMENTS

DE 102010049541 A1 * 4/2012 ............. F01D 5/187
EP 1584789 B1 6/2007
JP 55-117008 A 9/1980

OTHER PUBLICATIONS

International Search Report and Written Opinion dated Aug. 28, 2015, for corresponding PCT Application No. PCT/US2014/069128.

(Continued)

*Primary Examiner* — David E Sosnowski
*Assistant Examiner* — Danielle M. Christensen
(74) *Attorney, Agent, or Firm* — Kinney & Lange, P.A.

(57) ABSTRACT

In one example embodiment, a blade includes an attachment region, an airfoil extending from the attachment region, and a blade cooling arrangement. The blade cooling arrangement includes at least a first feed passage disposed through the attachment region, which is connected to a first cooling passage disposed in the airfoil. A passively actuated first coolant valve is disposed in or proximate the first feed passage. A plurality of such blades can be disposed in a turbine section of an engine.

25 Claims, 7 Drawing Sheets

Related U.S. Application Data

(60) Provisional application No. 61/916,719, filed on Dec. 16, 2013.

(51) Int. Cl.
*F02C 3/04* (2006.01)
*F02C 7/12* (2006.01)

(52) U.S. Cl.
CPC ............ *F02C 7/12* (2013.01); *F05D 2220/32* (2013.01); *F05D 2240/303* (2013.01); *F05D 2240/304* (2013.01); *F05D 2260/201* (2013.01); *F05D 2260/202* (2013.01); *F05D 2300/175* (2013.01); *F05D 2300/505* (2013.01); *Y02T 50/60* (2013.01)

(58) Field of Classification Search
CPC ......... F05D 2240/303; F05D 2240/304; F05D 2260/201; F05D 2260/202
See application file for complete search history.

(56) References Cited

U.S. PATENT DOCUMENTS

| | | |
|---|---|---|
| 4,296,599 A | 10/1981 | Adamson |
| 4,416,111 A | 11/1983 | Lenahan et al. |
| 4,708,588 A | 11/1987 | Schwarz et al. |
| 4,709,546 A | 12/1987 | Weiler |
| 4,730,982 A | 3/1988 | Kervistin |
| 4,740,138 A | 4/1988 | Zaehring et al. |
| 5,996,331 A | 12/1999 | Palmer |
| 6,485,255 B1 * | 11/2002 | Care ...................... F01D 5/187 415/12 |
| 6,931,859 B2 | 8/2005 | Morgan et al. |
| 8,061,987 B1 | 11/2011 | Liang |
| 9,188,010 B2 * | 11/2015 | Jha .......................... F01D 5/087 |
| 2003/0118445 A1 | 6/2003 | Lee et al. |
| 2009/0004006 A1 | 1/2009 | Dejaune et al. |

OTHER PUBLICATIONS

International Preliminary Report on Patentability, for PCT Application No. PCT/US2014/069128, dated Jun. 21, 2016, 12 pages.

* cited by examiner

CENTRIFUGAL AIRFOIL COOLING MODULATION

CROSS-REFERENCE TO RELATED APPLICATION(S)

This application is a continuation of U.S. application Ser. No. 15/100,925 filed Jun. 1, 2016 for "Centrifugal Airfoil Cooling Modulation" by L. Thornton and T. Slavens, which is a 371 of PCT Application No. PCT/US2014/069128 filed on Dec. 8, 2014, for Centrifugal Airfoil Cooling Modulation" by L. Thornton and T. Slavens, which in turn claims the benefit of U.S. Provisional Application No. 61/916,719 filed Dec. 16, 2013 for "Centrifugal Airfoil Cooling Modulation" by L. Thornton and T. Slavens.

BACKGROUND

The described subject matter relates generally to turbine engines, and more specifically to internally cooled airfoils for turbine engines.

Gas turbine engines are known and when used on aircraft typically include a fan delivering air into a bypass duct and into a compressor section. Air from the compressor is passed downstream into a combustion section where it is mixed with fuel and ignited. Products of this combustion pass downstream over turbine rotors driving them to rotate.

With increases in compressor and turbine temperatures, it becomes more important to efficiently utilize the air that is delivered into the compressor while maintaining or increasing the useful life of turbine blades. One source of inefficiency is in the varying cooling requirements at different operating conditions. For example, cooling requirements at cruise and idle conditions are much lower than at high-power conditions. Some of the cooling requirements are of course naturally mediated by the lower compressor speed generating less cooling air. Other attempts have been made to provide thermally controlled valves to the cooling manifold. However, further mediation of cooling air would be useful to increase efficiency at low engine speeds such as cruise, while also potentially reducing tip clearance requirements.

SUMMARY

In one example embodiment, a blade includes an attachment region, an airfoil extending from the attachment region, and a blade cooling arrangement. The blade cooling arrangement includes at least a first feed passage disposed through the attachment region, which is connected to a first cooling passage disposed in the airfoil. A passively actuated first coolant valve is disposed in or proximate the first feed passage.

In another example embodiment, a turbofan engine includes a compressor section in flow series with an upstream core inlet, a combustor section adapted to combine fuel with compressed air received from the compressor which is combusted to form a working fluid; and a turbine section adapted to convert energy of the working fluid into rotation of at least one shaft. The turbine section includes a plurality of circumferentially distributed turbine blades each of which includes an attachment region, an airfoil extending from the attachment region, and a blade cooling arrangement. The blade cooling arrangement includes at least a first feed passage disposed through the attachment region, which is connected to a first cooling passage disposed in the airfoil. A centrifugally actuated first coolant valve is disposed in or proximate the first feed passage.

DETAILED DESCRIPTION

Figure 1:
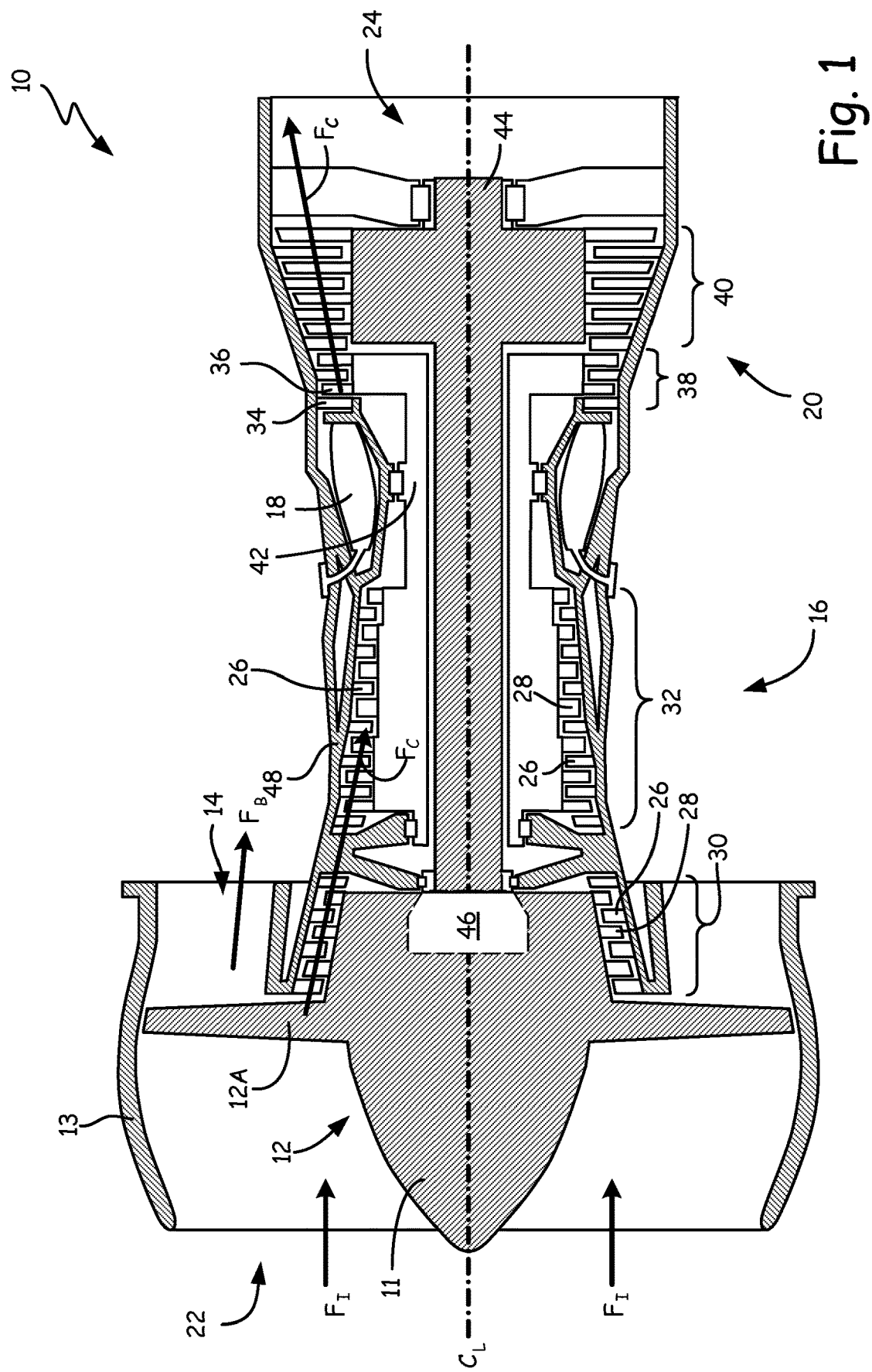
FIG. 1 is a perspective view of a gas turbine engine.

FIG. 1 is a cross sectional view of gas turbine engine 10 in a turbofan environment. As shown in FIG. 1, turbine engine 10 includes fan 12 with at least one fan rotor positioned in bypass duct 14. Bypass duct 14 can be oriented about a turbine core comprising compressor section 16, combustor (or combustors) 18, and turbine section 20, arranged in flow series with upstream inlet 22 and downstream exhaust stream 24.

In the example dual-spool configuration shown in FIG. 1, compressor 16, in flow series with an upstream core inlet, includes stages of compressor vanes 26 and blades 28 arranged in low pressure compressor (LPC) section 30 and high pressure compressor (HPC) section 32. Turbine 20 has stages of turbine vanes 34 and turbine blades 36 arranged in high pressure turbine (HPT) section 38 and low pressure turbine (LPT) section 40. HPT section 38 can be coupled to HPC section 32 via HPT shaft 42, forming the high pressure spool or high spool. LPT section 40 can similarly be coupled to LPC section 30 via LPT shaft 44, forming the low pressure spool or low spool. HPT shaft 42 and LPT shaft 44 are typically coaxially mounted, with the high and low spools independently rotating about engine axis/center line ($C_L$).

Fan 12 typically includes a plurality of fan airfoils 12A circumferentially arranged around at least one fan hub 11 or other rotating member(s) in fan shroud 13. Fan hub 11 can be coupled either directly or indirectly to LPC section 30 and driven by LPT shaft 44. In certain embodiments, fan hub 11 is coupled via epicyclic gear system 46 linked to a fan shaft (not visible in FIG. 1), providing reduction of the fan speed relative to the speed of the rest of the low spool. In certain embodiments, epicyclic gear system 46 is configured to provide independent fan speed control, such as by utilizing a variable gear ratio.

As shown in FIG. 1, fan 12 is forward mounted and provides thrust by accelerating flow downstream through bypass duct 14, for example, in a high bypass configuration suitable for commercial and regional jet aircraft operations. Alternatively, fan 12 may be an unducted fan or propeller assembly, in either a forward or aft mounted configuration. In these various embodiments, turbine engine 10 comprises any of a high bypass turbofan, a low bypass turbofan or a turbo prop engine, in which the number of spools and shaft configurations may vary. In operation of turbine engine 10, incoming airflow $F_I$ enters inlet 22 and divides into core flow $F_C$ and bypass flow $F_B$ downstream of fan hub(s) 11. Core flow $F_C$ propagates along the core flow path through compressor section 16, combustor 18, and turbine section 20, while bypass flow $F_B$ propagates along the bypass flowpath through bypass duct 14. The one or more stages of LPC section 30 and HPC section 32 are utilized to compress incoming air for combustor 18 adapted to combine fuel with compressed air received from compressor 16, and which is combusted to produce hot combustion gas, which serves as a working fluid to drive turbine 20.

Combustion gas exits combustor 18 and enters HPT (section 38) of turbine 20, encountering turbine vanes 34 and turbine blades 36. Turbine vanes 34 turn and accelerate flow, and turbine blades 36 generate lift for conversion to rotational energy of the working fluid via HPT shaft 42, driving HPC section 32 of compressor 16. Partially expanded combustion gas transitions from HPT 38 to LPT 40, driving LPC section 30 and fan 11 via LPT shaft 44. Exhaust flow exits LPT 40 and turbine engine 10 via exhaust nozzle 24.

Depending on the particular embodiment, fan hub 11 can also provide a degree of compression (or pre-compression) to core flow $F_C$, allowing some or all of LPC section 30 to be omitted. In certain embodiments, engine 10 can be additionally and/or alternatively provided with one or more intermediate spools, for example, in a three-spool turboprop or turbofan configuration.

Thermodynamic efficiency of turbine engine 10 is tied to the overall pressure ratio as defined between the delivery pressure at inlet 22 and the compressed air pressure entering combustor 18 from compressor section 16. In general, a higher pressure ratio offers increased efficiency and improved performance including greater specific thrust. High pressure ratios also result in increased peak gas path temperatures, higher core pressure, and greater flow rates, increasing thermal and mechanical stress on engine components. One way to achieve large pressure ratios is to provide a large diameter fan 12 (and accompanying large diameter bypass duct 14) relative to the engine power core diameter.

The following figures illustrate an example cooled blade for a turbine engine which includes at least one passive, centrifugally actuated coolant valve disposed in or about the blade attachment region. The passive valve can take several forms and can be configured based on average and peak cooling requirements. Precursors of various valve shapes can be cast in, then machined out prior to use. Alternatively, certain configurations (or precursors) of passively actuated valve(s) can be incorporated into additive manufacturing processes of the blade.

Figure 2A:
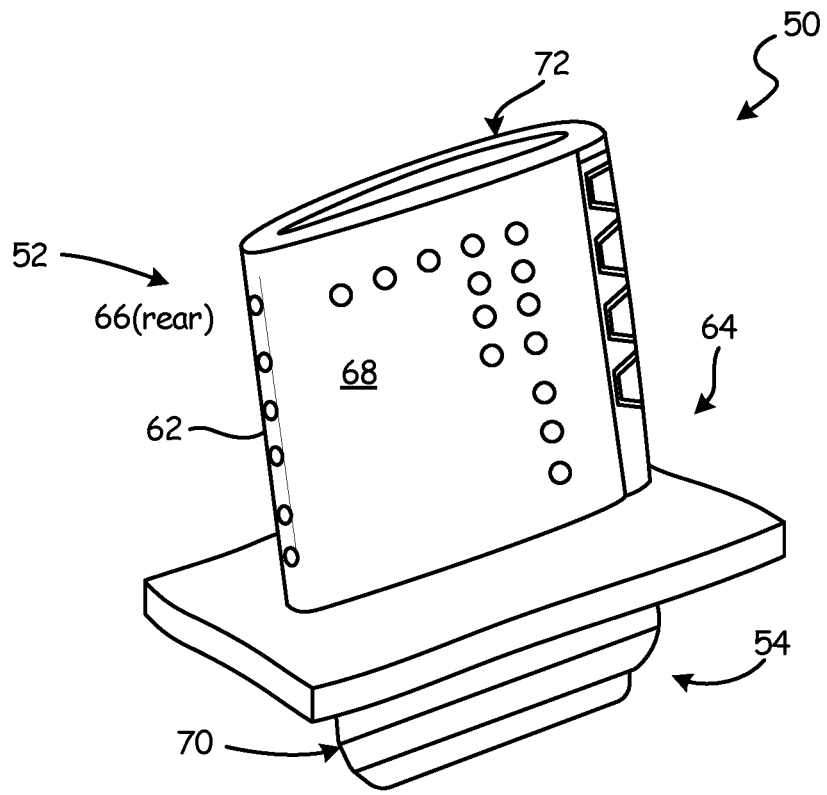
FIG. 2A shows an example blade for use in a gas turbine engine.
Figure 2B:
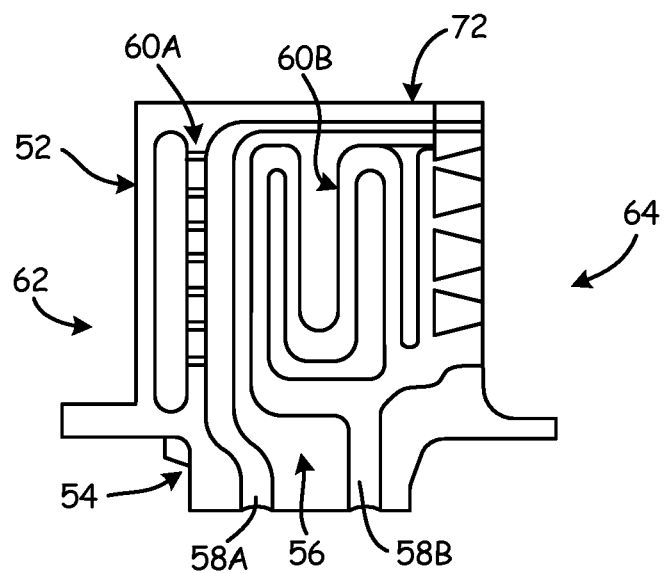
FIG. 2B is a sectional view of a blade with an example cooling arrangement.

FIG. 2A shows blade 50 with airfoil 52 extending from attachment region 54. FIG. 2B is a sectional view of blade 50 taken through airfoil 52 and attachment region 54, and which illustrates blade cooling arrangement 56 in more detail. Blade 50 can be formed from, for example, a nickel-based superalloy substrate, or another suitable substrate material. Surfaces of airfoil 52, attachment region 54, and/or blade cooling arrangement 56 can be provided with one or more coatings protecting such surfaces from corrosive, erosive and/or other thermal damage.

Blade cooling arrangement 56 as shown in this disclosure is merely provided as one example arrangement. Blade cooling arrangement 56 can include at least a first (e.g., a forward) feed passage 58A disposed through attachment region 54, and which is connected to a corresponding forward cooling passage 60A disposed in the airfoil. Blade cooling arrangement 56 can additionally and/or alternatively include subsequent feed passage(s) 58B and/or cooling passage(s) 60B, each of which may be in communication with each other and/or other feed passage(s) and/or cooling passage(s) as appropriate.

In the particular illustrative example shown in the several figures, blade cooling arrangement 56 can include forward and aft cooling passages 60A, 60B, each of which can have one or more branches as shown. As seen in FIG. 2B, forward cooling passage 60A is disposed in a forward portion of airfoil 52 and includes a leading edge impingement passage in communication with a tip cooling passage. Second cooling passage 60B, in the illustrative example, includes a multipass serpentine passage in communication with a trailing edge cooling passage. It will be appreciated that other embodiments of blade cooling arrangement 56 can include one or more cooling passages with various combinations of the above described examples, as well as a number of other conventional and inventive cooling configurations such as sidewall microcircuits. The particular cooling arrangement is shaped and sized to tailor typical and peak cooling requirements to a particular thermal profile, material selections, and other considerations.

The external profile of airfoil body 52, can be generally similar to known or inventive airfoil profiles, which generally includes a respective suction sidewall 66 and pressure sidewall 68 extending chordwise between leading edge 62 and trailing edge 64, and spanwise between root 70 and tip 72. Root 70 can include a dovetail or other suitable attachment for securing blade 50 to a turbine disk (omitted for clarity). Tip 72 can include, for example, a tip cap, a tip shelf, or other structure. Though shown as unshrouded, tip 72 can alternatively include a tip shroud of suitable geometry. A plurality of film cooling holes 74 can be formed through suction sidewall 66 and/or pressure sidewall 68 between the forward cooling passage and an exterior of the blade. Cooling apertures 74 can additionally and/or alternatively provide fluid communication between cooling arrangement 56 and the exterior of leading edge 62, trailing edge 64, root 70, and/or tip 72.

Though omitted for clarity from FIG. 2B, blade 50 can also include one or more passively actuated coolant valves (i.e., at least a first coolant valve). The passively actuated coolant valve(s) can be disposed in or proximate feed passage(s) 58A, 58B. The coolant valve(s) can be centrifugally actuated, for example during rotation of the blade above a certain threshold speed which results in a force applied effectively in a spanwise direction of blade 50. The threshold speed can be tailored to take into account the potential for higher coolant supply pressure at higher engine speeds, as appropriate.

Figure 3A:
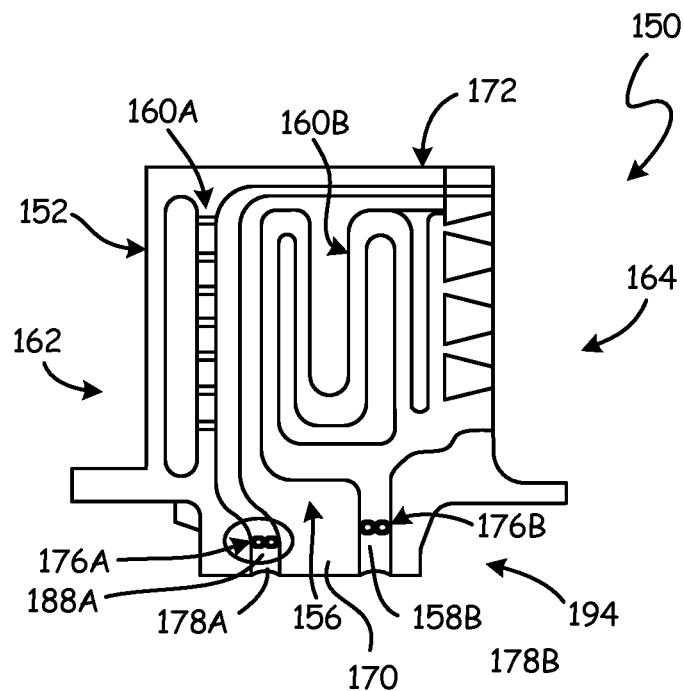
FIG. 3A shows the cooled blade with a first example embodiment of a passive coolant valve in an open position.
Figure 3B:
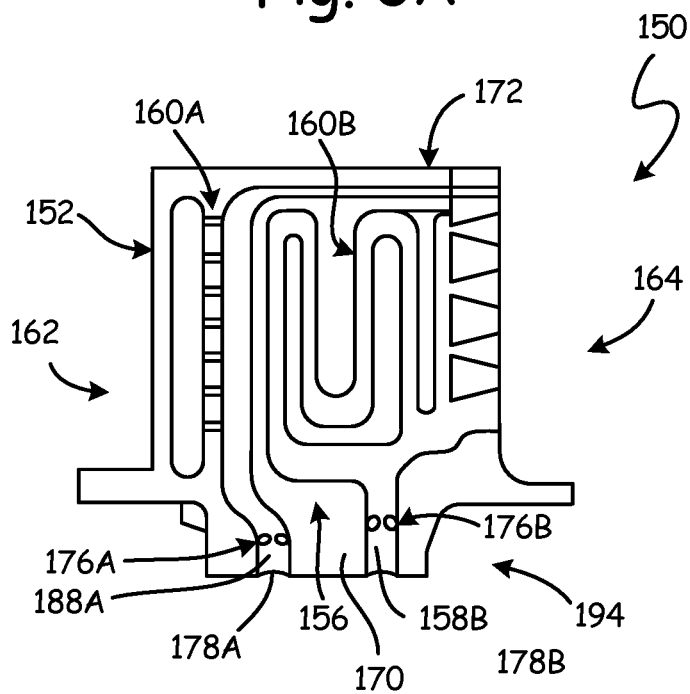
FIG. 3B shows the cooled blade with the first example passive coolant valve embodiment in a closed position.
Figure 4A:
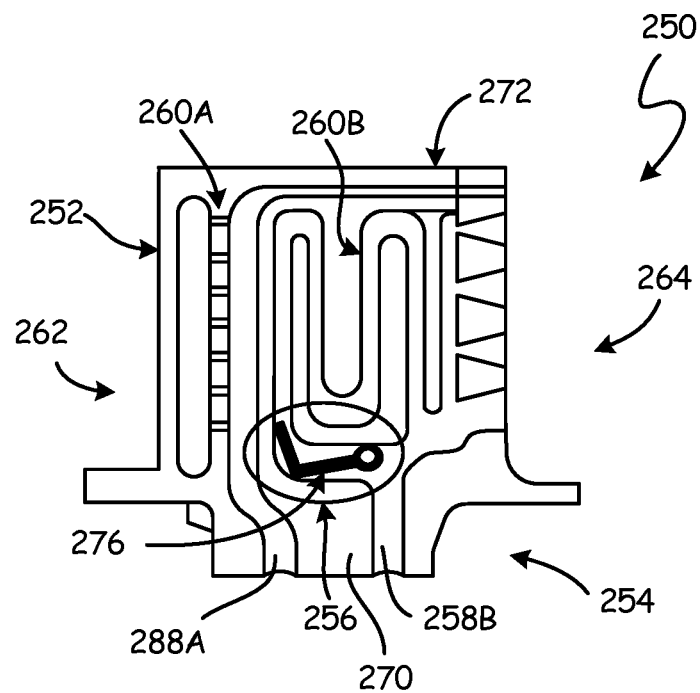
FIG. 4A shows the cooled blade with a second embodiment of a passive coolant valve in an open position.
Figure 4B:
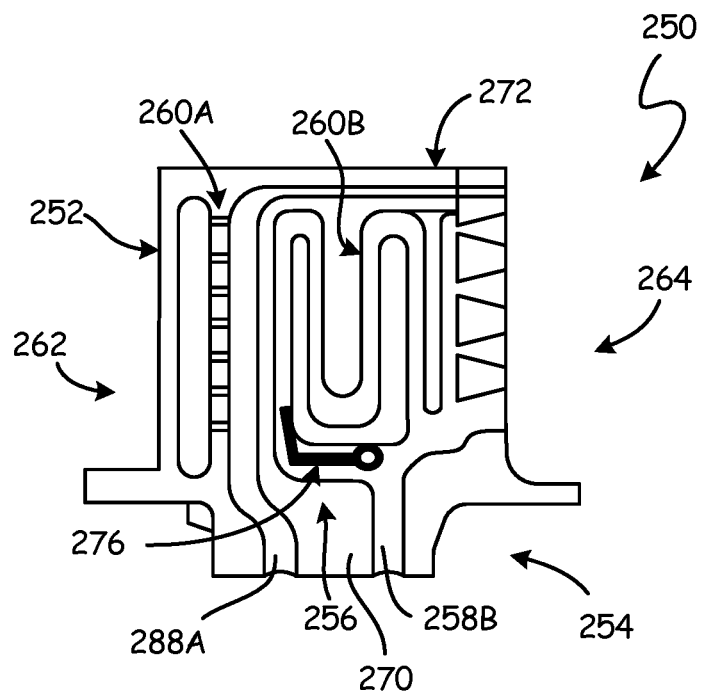
FIG. 4B shows the cooled blade with the second example embodiment of a passive coolant valve in a closed position.

The following figures illustrate three example coolant valve embodiments in respective open and closed positions. FIGS. 3A and 3B show an example where a coolant valve is disposed within the forward root passage inward of an opening to the forward root passage. FIGS. 4A and 4B show a valve disposed in one branch of a cooling passage. These and other example embodiments can be combined such that the coolant valves control only part of the blade cooling arrangement (e.g., only some branches of one or more cooling passages).

FIGS. 3A and 3B show a first example embodiment of blade 150 with airfoil section 152 extending radially from attachment region 154. Blade cooling arrangement 156 includes coolant valve 176A disposed in forward root passage 158A extending through blade root 170. Coolant valve 176A is disposed between forward root opening 178A and forward coolant passage 160A, a portion of which extends generally radially along a forward portion of airfoil section 152 and which can feed cooling air to apertures 174 along leading edge 162. Apertures 174 in communication with coolant passage 160B (disposed aft of coolant passage 160A) can also be provided along trailing edge 164, tip 172, and/or one or more sidewalls (not shown). Coolant valve 176B can be additionally or alternatively in second root passage 158B between second root opening 178B and second coolant passage 160B, which includes a multi-pass serpentine through airfoil section 152, and discharges out from trailing edge 164. In yet other alternative embodiments, one or both coolant valves 176A, 176B can be co-located with root opening(s) 178A, 178B, and can be operable to regulate coolant flow into corresponding root/feed passage(s) 158A, 158B.

Figure 3C:
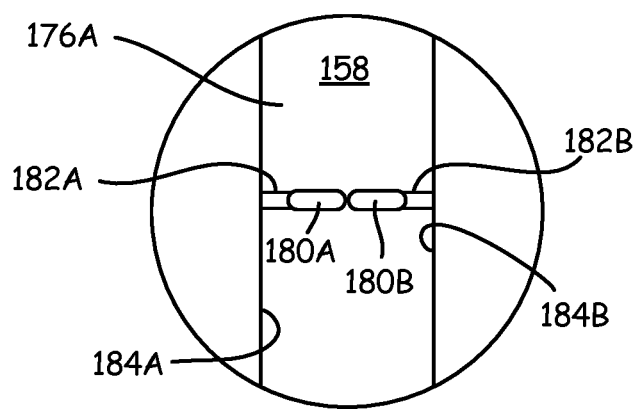
FIG. 3C is a magnified view of the first passive coolant valve embodiment.

As best seen in FIG. 3C, coolant valve 176A can include at least one blocking element 180A having first hinge portion 182A, attached to a first blade surface (here, first root passage surface 184A). First blocking element 180A extends from first hinge portion 182A and across a portion of blade cooling arrangement 156 (here, first root/feed passage 158A). A second blocking element 180B can also secured to a second surface of the blade (here, second root passage surface 184B).

One or both hinge portions 182A, 182B can include a resilient element having at least one end attached to root passage surfaces 184A, 184B and/or to another surface of blade 150. Here, as seen in FIGS. 3A and 3C, first blocking element 180A and second blocking element 180B engage with one another in the closed position. Alternatively, first blocking element 180A can selectively engage, for example, a second blade surface of the blade disposed proximate the first blade surface. One example blade surface includes root passage surface 184B.

FIGS. 4A and 4B show a second example embodiment of blade 250 with airfoil section 252 extending radially from attachment region 254. Blade cooling arrangement 256 includes root/feed passages 258A, 258B extending through blade root 270 between root openings 278A, 278B and entrances of respective cooling passages 260A, 260B. One or more branches of cooling passage 260A, namely an impingement cavity and feed passage, can extend generally radially along a forward portion of airfoil section 252. Cooling passage 260A can feed coolant to apertures 274, providing communication with the exterior of blade 250 along leading edge 262. Similarly, cooling passage 260B, which can be disposed aft of cooling passage 260A, can also have cooling apertures 274 providing communication with the blade exterior along trailing edge 266, tip 272, and/or one or more blade sidewalls (not shown). Blade cooling arrangement 256 also includes coolant valve 276 disposed in one branch of second cooling passage 260B. Here, one or more passively actuated coolant valves 276A are operable to control coolant flow into only certain branches of second cooling passage 260B.

In certain of these embodiments, centrifugally actuated second coolant valve 276 can be disposed in or proximate second feed passage 260B so as to provide independent passive coolant control of only certain branch(es) of cooling passages 260A, 260B. For example, leading and trailing edge cooling demands are typically greater than cooling demands along the sidewalls of the blade. Thus the valves can be tailored to open at different rotor speeds and/or combinations of rotor speed and coolant manifold pressure.

Figure 4C:
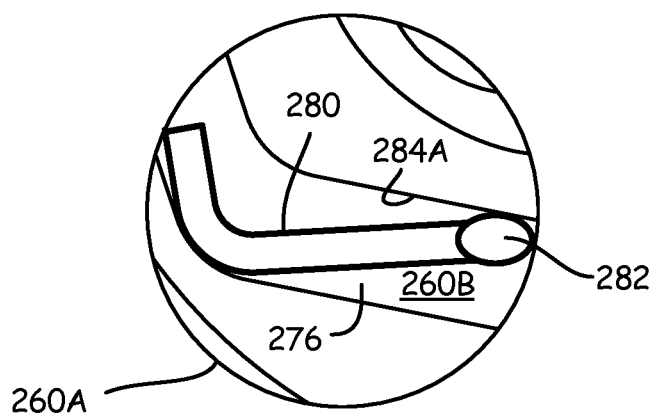
FIG. 4C is a magnified view of the second example embodiment shown in FIG. 4B.

As best seen in FIG. 4C, coolant valve 276 can include at least one blocking element 280 having hinge portion 282, attached to a first blade surface (here first root passage surface 284A).

As seen in FIGS. 3A-4B, multiple cooling passages may branch off and thus can be fed by the same (i.e., first or second) feed passage. For example, coolant passage 260B (shown in FIGS. 4A-4B) includes a multi-pass serpentine passage with main inlet 288, and an additional refresher hole 290 proximate trailing edge 264. Though not shown, second coolant valve 276 can be provided along with one or more coolant valves 176A, 176B (shown in FIGS. 3A and 3B) as well.

Forward cooling passage 260A remains open to root passage 258A, thus allowing leading edge 262 to be cooled regardless of engine speed. In this particular configuration, leading edge 262 is impingement cooled and can also include leading edge cooling apertures (e.g., apertures 274). It can also be seen that forward cooling passage 260A includes a tip cooling branch connected to the impingement feed passage, neither of which are restricted by coolant valve 276. In the example of FIGS. 4A and 4B, a portion of coolant passage 260B also remains open to root passage 258B, ensuring cooling of trailing edge 264 via apertures 274 regardless of rotor speed. This can maintain the integrity of the hot, high cooling demand leading and/or trailing edges while restricting maximum coolant flow to the serpentine only to high engine demand (e.g., high power) applications.

Figure 5A:
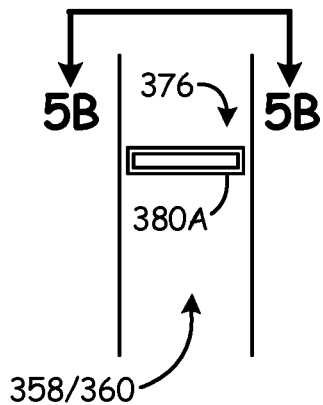
FIG. 5A shows a third example embodiment of a passive coolant valve.
Figure 5B:
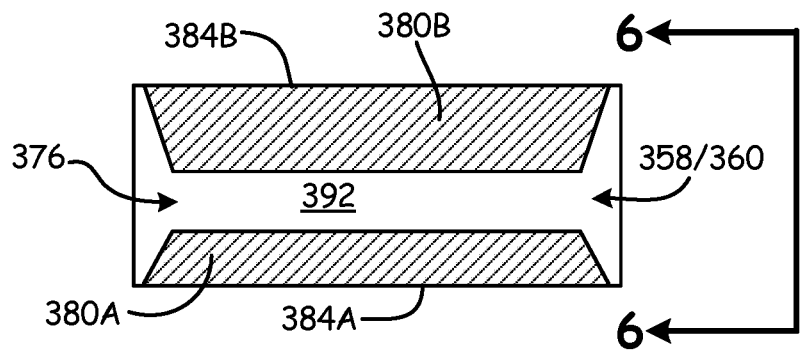
FIG. 5B is a downward facing view of the passive coolant valve shown in FIG. 5A.

FIG. 5A shows a third example embodiment of a passively actuated coolant valve 376. FIG. 5B is a downward facing view of coolant valve 376 through the internal passage. The passage shown in FIGS. 5A and 5B can be either a root passage 358 or coolant passage 360 disposed in the airfoil, similar to the configurations shown in prior examples. In the third example embodiment, passively actuated coolant valve 376 can include at least one blocking element such as flaps 380A, 380B secured to corresponding blade surfaces 384A, 384B. This configuration is sometimes referred to as a reed valve.

Figure 6A:
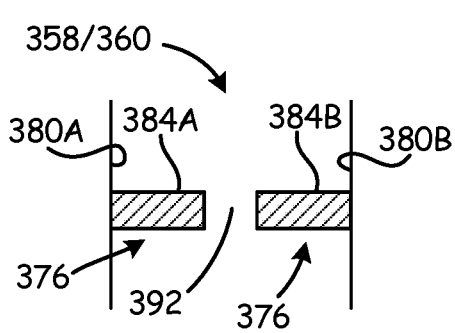
FIG. 6A shows the third coolant valve embodiment in a closed position.
Figure 6B:
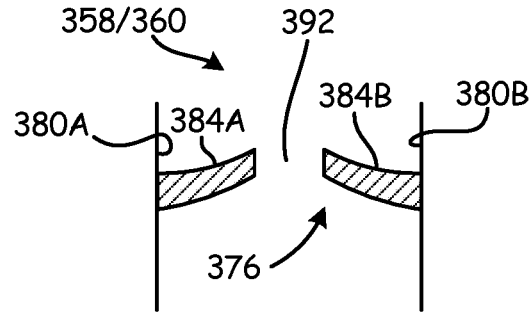
FIG. 6B shows the third embodiment of the passive coolant valve in an open position.

FIGS. 6A and 6B show the passively actuated coolant valve 376 in two different states. In FIG. 6A, the rotor can be stationary or can be below a threshold speed, with valve therefore in a substantially closed position. FIG. 6B shows the actuation state of coolant valve 376 when the rotor is above the threshold speed, which can be up to and including a maximum rotor speed. In this example, the at least one flap 380A, 380B may be weighted (not shown) or otherwise configured with a heavier or thicker portion around the center of passage 358/360 so that the passively actuated valve can operate based on engine rotor speed as described earlier. There can also be an optional opening 392 between flaps 380A, 380B to allow some coolant flow through passage 358/360 regardless of rotor speed and/or to facilitate actuation of valve 376.

One or more of coolant valves 176, 276, 376 (shown in various figures) can be centrifugally opened in a first operational state above a minimum rotor speed, and are closed in a second operational state below the minimum rotor speed. This rotor speed will depend mainly on operational and life requirements of the blade. However, the threshold rotor speed typically will lie somewhere above idle/cruise speed so that maximum cooling air demand coincides with maximum heating and thermal stress on the turbine blades.

Discussion of Possible Embodiments

The following are non-exclusive descriptions of possible embodiments of the present invention.

In one example embodiment, a blade includes an attachment region, an airfoil extending from the attachment region, and a blade cooling arrangement. The blade cooling arrangement includes at least a first feed passage disposed through the attachment region, which is connected to a first cooling passage disposed in the airfoil. A passively actuated first coolant valve is disposed in or proximate the first feed passage.

The blade of the preceding paragraph can optionally include, additionally and/or alternatively, any one or more of the following features, configurations and/or additional components:

A blade according to an exemplary embodiment of this disclosure, among other possible things includes an attachment region; an airfoil extending from the attachment region; a blade cooling arrangement including at least a first feed passage disposed through the attachment region, and connected to a first cooling passage disposed in the airfoil; and a passively actuated first coolant valve disposed in or proximate the first feed passage.

A further embodiment of the foregoing blade, wherein the blade comprises a nickel-based superalloy substrate.

A further embodiment of any of the foregoing blades, wherein the first cooling passage is selected from: a serpentine passage, a leading edge impingement passage, a trailing edge cooling passage, and a sidewall microcircuit.

A further embodiment of any of the foregoing blades, wherein the airfoil includes one of: a tip cap and a tip shelf.

A further embodiment of any of the foregoing blades, wherein the first coolant valve is actuated in response to a centrifugal force applied in a spanwise direction of the blade.

A further embodiment of any of the foregoing blades, wherein the first coolant valve is disposed over an opening to the first root passage.

A further embodiment of any of the foregoing blades, wherein the first coolant valve is disposed within the first root passage.

A further embodiment of any of the foregoing blades, wherein the first coolant valve is disposed proximate an interface between the first root passage and the first cooling passage.

A further embodiment of any of the foregoing blades, wherein the airfoil also includes a plurality of film cooling holes formed through a sidewall of the airfoil between the first cooling passage and an exterior of the blade.

A further embodiment of any of the foregoing blades, wherein the first coolant valve includes a blocking element attached to a first blade surface.

A further embodiment of any of the foregoing blades, wherein the blocking element comprises a first hinge portion attached to the first blade surface; and a first blocking portion extending from the first hinge portion and across a portion of the blade cooling arrangement.

A further embodiment of any of the foregoing blades, wherein the first hinge portion includes a resilient element having at least one end attached to the first blade surface.

A further embodiment of any of the foregoing blades, wherein the first blocking element includes a reed valve comprising a first flap attached to the first blade surface.

A further embodiment of any of the foregoing blades, wherein the reed valve further comprises a second flap attached to a second blade surface opposing the first blade surface.

A further embodiment of any of the foregoing blades, wherein the first blocking portion selectively engages at least one of: a second blade surface of the blade disposed proximate the first blade surface; and a second blocking portion secured to the second surface of the blade.

A further embodiment of any of the foregoing blades, wherein the blade cooling arrangement also includes a second cooling passage disposed in the airfoil.

A further embodiment of any of the foregoing blades, wherein the blade cooling arrangement also includes a second feed passage disposed in the attachment region.

A further embodiment of any of the foregoing blades, wherein the blade further comprises a centrifugally actuated second coolant valve disposed in or proximate the second feed passage.

In another example embodiment, a turbofan engine includes a compressor section in flow series with an upstream core inlet, a combustor section adapted to combine fuel with compressed air received from the compressor which is combusted to form a working fluid; and a turbine section adapted to convert energy of the working fluid into rotation of at least one shaft. The turbine section includes a plurality of circumferentially distributed turbine blades each of which includes an attachment region, an airfoil extending from the attachment region, and a blade cooling arrangement. The blade cooling arrangement includes at least a first feed passage disposed through the attachment region, which is connected to a first cooling passage disposed in the airfoil. A centrifugally actuated first coolant valve is disposed in or proximate the first feed passage.

The turbofan engine of the preceding paragraph can optionally include, additionally and/or alternatively, any one or more of the following features, configurations and/or additional components:

A turbofan engine according to an exemplary embodiment of this disclosure, among other possible things includes a compressor section in flow series with an upstream core inlet; a combustor section adapted to combine fuel with compressed air received from the compressor which is combusted to form a working fluid; and a turbine section adapted to convert energy of the working fluid into rotation of at least one shaft, the turbine section including a plurality of turbine blades circumferentially distributed about at least one turbine disk, each of the plurality of turbine blades including: an attachment region secured to the at least one turbine disk; an airfoil extending from the attachment region; a blade cooling arrangement including at least a first feed passage disposed through the attachment region, and connected to a first cooling passage disposed in the airfoil; and a centrifugally actuated first coolant valve disposed in or proximate the first feed passage.

A further embodiment of the foregoing turbofan engine, wherein the first cooling passage is selected from: a serpentine passage, a leading edge impingement passage, a trailing edge cooling passage, and a sidewall microcircuit.

A further embodiment of any of the foregoing turbofan engines, wherein each of the first coolant valves are centrifugally opened in a first operational state above a minimum rotor speed, and are closed in a second operational state below the minimum rotor speed.

A further embodiment of any of the foregoing turbofan engines, wherein at least one of the first coolant valves is disposed over an opening to the corresponding first root passage.

A further embodiment of any of the foregoing turbofan engines, wherein at least one of the first coolant valves is disposed within the corresponding first root passage.

Although the present invention has been described with reference to preferred embodiments, workers skilled in the art will recognize that changes may be made in form and detail without departing from the spirit and scope of the invention.

The invention claimed is:

1. A blade comprising:
   an attachment region;
   an airfoil extending from the attachment region;
   a blade cooling arrangement including at least a first feed passage disposed through the attachment region, and connected to a first cooling passage disposed in the airfoil; and
   a passively actuated first coolant valve disposed in or proximate the first feed passage;
   wherein the first coolant valve includes a first blocking element attached to a first blade surface, wherein the first coolant valve is actuated in response to a centrifugal force applied in a spanwise direction of the blade; and
   wherein the first blocking element comprises:
      a first hinge portion; and
      a first blocking portion extending from the first hinge portion and across a portion of the blade cooling arrangement.

2. The blade of claim 1, wherein the first cooling passage is selected from: a serpentine passage, a leading edge impingement passage, a trailing edge cooling passage, and a sidewall microcircuit.

3. The blade of claim 1, wherein the first coolant valve is disposed over an opening to the first feed passage.

4. The blade of claim 1, wherein the first coolant valve is disposed within the first root passage or proximate an interface between the first root passage and the first cooling passage.

5. The blade of claim 1, wherein the airfoil also includes a plurality of film cooling holes formed through a sidewall of the airfoil between the first cooling passage and an exterior of the blade.

6. The blade of claim 1, wherein the first hinge portion includes a resilient element having at least one end attached to the first surface of the blade.

7. The blade of claim 1, wherein the first blocking element includes a reed valve comprising a first flap attached to the first blade surface.

8. The blade of claim 7, wherein the reed valve further comprises a second flap attached to a second blade surface opposing the first blade surface.

9. The blade of claim 1, wherein the first blocking portion selectively engages at least one of:
   a second blade surface of the blade disposed proximate the first blade surface; and
   a second blocking portion secured to the second surface of the blade.

10. The blade of claim 1, wherein the blade cooling arrangement also includes a second cooling passage disposed in the airfoil.

11. The blade of claim 1, wherein the blade cooling arrangement also includes a second feed passage disposed in the attachment region, and the blade further comprises a centrifugally actuated second coolant valve disposed in or proximate the second feed passage.

12. A blade comprising:
   an attachment region;
   an airfoil extending from the attachment region;
   a blade cooling arrangement including at least a first feed passage disposed through the attachment region, and connected to a first cooling passage disposed in the airfoil; and
   a passively actuated first coolant valve disposed in or proximate the first feed passage;
   wherein the first coolant valve includes a first blocking element attached to a first blade surface, wherein the first coolant valve is actuated in response to a centrifugal force applied in a spanwise direction of the blade; and
   wherein the first blocking element includes a reed valve comprising a first flap attached to the first blade surface.

13. The blade of claim 12, wherein the first cooling passage is selected from: a serpentine passage, a leading edge impingement passage, a trailing edge cooling passage, and a sidewall microcircuit.

14. The blade of claim 12, wherein the first coolant valve is disposed over an opening to the first feed passage, or within the first feed passage, proximate an interface between the first feed passage and the first cooling passage.

15. The blade of claim 12, wherein the airfoil also includes a plurality of film cooling holes formed through a sidewall of the airfoil between the first cooling passage and an exterior of the blade.

16. The blade of claim 12, wherein the first coolant valve includes a first blocking element attached to a first blade surface, the first blocking element comprising:
   a first hinge portion; and
   a first blocking portion extending from the first hinge portion and across a portion of the blade cooling arrangement.

17. The blade of claim 16, wherein the first hinge portion includes a resilient element having at least one end attached to the first surface of the blade.

18. The blade of claim 16, wherein the first blocking portion selectively engages at least one of:
   a second blade surface of the blade disposed proximate the first blade surface; and
   a second blocking portion secured to the second surface of the blade.

19. The blade of claim 12, wherein the blade cooling arrangement also includes a second cooling passage disposed in the airfoil, and a second feed passage disposed in the attachment region, and the blade further comprises a centrifugally actuated second coolant valve disposed in or proximate the second feed passage.

20. A blade comprising:
   an attachment region;
   an airfoil extending from the attachment region;
   a blade cooling arrangement including at least a first feed passage and a second feed passage disposed through the attachment region, the first feed passage connected to a first cooling passage disposed in the airfoil;
   a passively actuated first coolant valve disposed in or proximate the first feed passage, wherein the first coolant valve is actuated in response to a centrifugal force applied in a spanwise direction of the blade; and
   a centrifugally actuated second coolant valve disposed in or proximate the second feed passage.

21. The blade of claim 20, wherein the first cooling passage is selected from: a serpentine passage, a leading edge impingement passage, a trailing edge cooling passage, and a sidewall microcircuit.

22. The blade of claim 20, wherein the first coolant valve is disposed over an opening to the first feed passage, or within the first feed passage, proximate an interface between the first feed passage and the first cooling passage.

23. The blade of claim 20, wherein the airfoil also includes a plurality of film cooling holes formed through a sidewall of the airfoil between the first cooling passage and an exterior of the blade.

24. The blade of claim 20, wherein the first coolant valve includes a first blocking element attached to a first blade surface, the first blocking element comprising:
   a first hinge portion; and
   a first blocking portion extending from the first hinge portion and across a portion of the blade cooling arrangement.

25. The blade of claim 24, wherein the first blocking portion selectively engages at least one of:
   a second blade surface of the blade disposed proximate the first blade surface; and
   a second blocking portion secured to the second surface of the blade.

* * * * *